United States Patent
Mizue et al.

(10) Patent No.: US 7,281,864 B2
(45) Date of Patent: Oct. 16, 2007

(54) OPTICAL PLUGGABLE TRANSCEIVER

(75) Inventors: Toshio Mizue, Yokohama (JP); Hiromi Kurashima, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/258,365

(22) Filed: Oct. 26, 2005

(65) Prior Publication Data
US 2006/0140552 A1 Jun. 29, 2006

Related U.S. Application Data

(60) Provisional application No. 60/622,802, filed on Oct. 29, 2004, provisional application No. 60/622,690, filed on Oct. 28, 2004.

(51) Int. Cl.
G02B 6/36 (2006.01)
(52) U.S. Cl. .......................... 385/92; 398/139
(58) Field of Classification Search ............... None
See application file for complete search history.

(56) References Cited

U.S. PATENT DOCUMENTS

| | | | |
|---|---|---|---|
| 5,280,191 A * | 1/1994 | Chang | 257/712 |
| 6,335,869 B1 | 1/2002 | Branch et al. | |
| 6,439,918 B1 | 8/2002 | Togami et al. | |
| 6,856,769 B1 * | 2/2005 | Steffensen et al. | 398/135 |
| 2004/0091268 A1 * | 5/2004 | Hogan et al. | 398/117 |

OTHER PUBLICATIONS

U.S. patent application by Toshio Mizue, also filed on Oct. 26, 2005, entitled Optical Pluggable Transceiver.
"Small Form-factor Pluggable (SFP) Transceiver MultiSource Agreement (MSA)"; Agilent Technologies, et al.; Sep. 14, 2000; pp. 1-38.

* cited by examiner

*Primary Examiner*—Tina M. Wong
(74) *Attorney, Agent, or Firm*—Smith, Gambrell & Russell, LLP

(57) ABSTRACT

The optical pluggable transceiver according to the present invention has features of a good heat dissipating function with a simplified configuration thereby reducing the cost of not only the component used but also the process itself. The transceiver of the present invention comprises a resin frame, an optical subassembly, a electronic substrate, both mounted on the frame, a heat dissipating member, made of metal, for conducting and radiating heat generated by the electronic circuit on the substrate, and a metal cover for putting these frame, subassembly, substrate, and heat dissipating member therein. A greater part of the surface of the heat dissipating member exposes from the cover, accordingly, the efficiency for radiating heat may be improved. Moreover, these members of the frame, the optical subassembly, the substrate, the heat dissipating member, and the cover are assembled only by fitting without screwing or gluing. Accordingly, the manufacturing process of the transceiver can be extremely simplified.

10 Claims, 12 Drawing Sheets

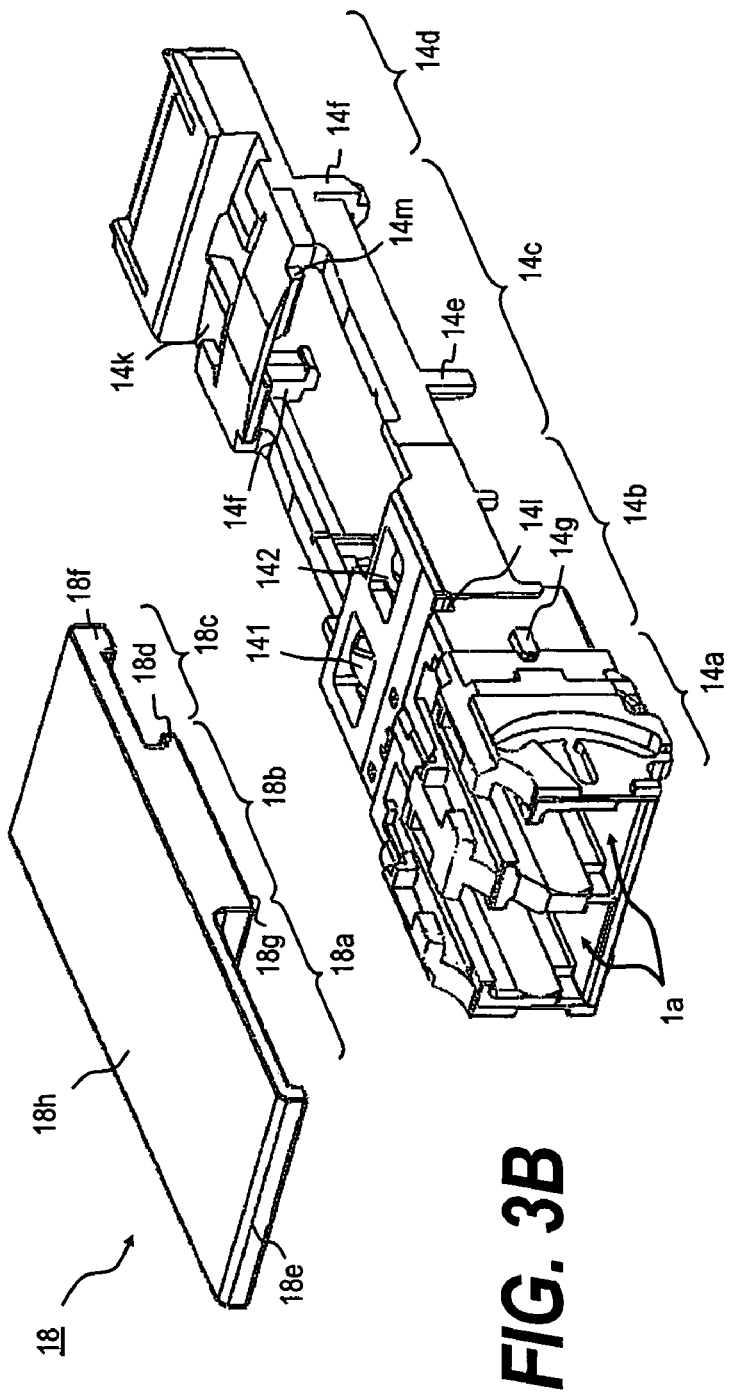
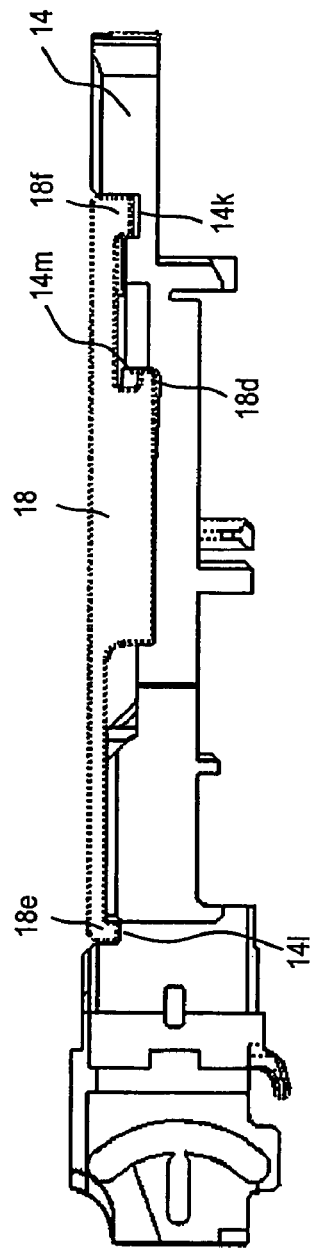
FIG. 3A
FIG. 3B
FIG. 3C

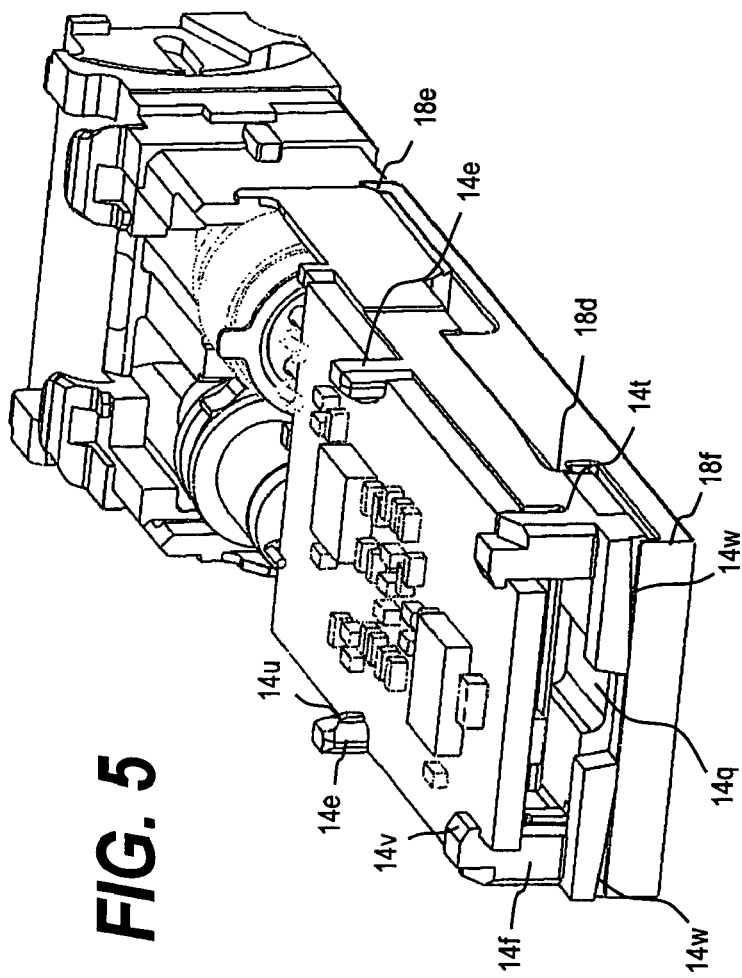
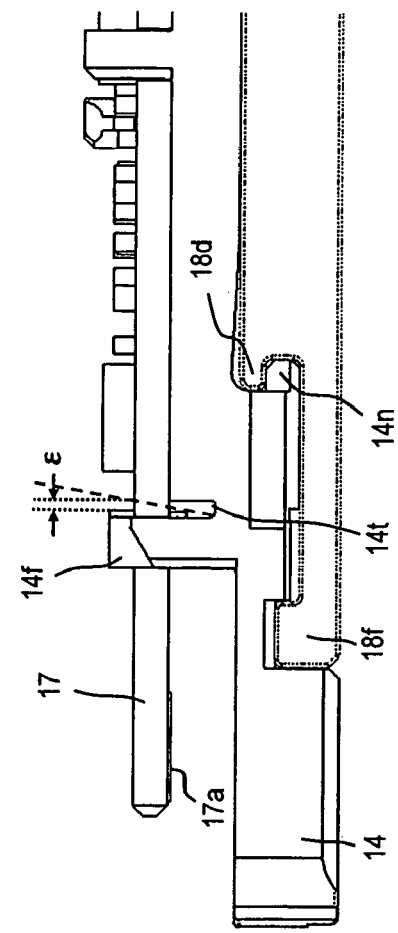
FIG. 5
FIG. 6 ial application Ser. No. 60/622,690, filed Oct. 28, 2004; and the provisional application Ser. No. 60/622,802, filed Oct. 29, 2004.

OPTICAL PLUGGABLE TRANSCEIVER

CROSS REFERENCE TO RELATED APPLICATIONS

The present application claims the benefit of the provisional application Ser. No. 60/622,690, filed Oct. 28, 2004; and the provisional application Ser. No. 60/622,802, filed Oct. 29, 2004.

BACKGROUND OF THE INVENTION

1. Field of the Invention

The present invention relates to a structure of a pluggable optical transceiver, in particular, the invention relates to a new structure of the transceiver which enables to reduce the cost of the production thereof.

2. Related Prior Art

The pluggable optical transceiver (hereinafter denoted as transceiver) is installed on the host system such that a cage, which is made of metal and has a box shape with one end being opened and protruded from the face panel of the host system, receives the transceiver in the open end thereof to expose the optical receptacle provided in the front end of the transceiver from the face panel of the host system. The optical receptacle receives an optical connector accompanied with an optical fiber. Thus, the optical fiber may optically couple with an optical device installed within the transceiver and establish the optical communication between the fiber and the optical device.

The cage provides an electrical connector in the deep end thereof, while the transceiver provides, in a rear end thereof, an electrical plug to mate with the electrical connector in the cage. By inserting the transceiver into the cage, the electrical plug of the transceiver comes to mate with the electrical connector, which enables the transceiver to communicate with the host system, namely, exchanging the electrical information and supplying the electrical power from the host system to the transceiver. Moreover, by setting the electrode of the plug in a preset configuration, the transceiver can be optionally inserted into or removed from the cage as the host system is powered on, which is the so-called hot-pluggable function.

One type of such pluggable transceiver has been specified in a multi-source agreement (MSA) as "Small Form-Factor Pluggable (SFP) Transceiver Multi Source Agreement" published through the internet <http://www.shelto.com/SFP/SFP MSA.pdf>. However, this MSA merely specifies the fundamental electrical specification, the pin-assigning, and the physical dimensions, rules no substantial architecture. The MSA only ensures that, as long as the transceiver satisfies the agreement, the transceiver can be installed within the cage and show the fundamental performance. Recently, the optical communication may be available in personal, namely, the optical fiber is brought to the independent home, and an optical transceiver that satisfies the agreement with the cost thereof further reduced has been requested.

The optical transceiver is roughly comprised of, an optical subassembly (hereinafter denoted as OSA) that communicates with the optical fiber and converts the optical signal into the electrical signal, or the electrical signal into the optical signal; an electronic circuit for processing the electrical signal and a substrate for installing the circuit thereon; a chassis for installing the OSA and the substrate thereon; and a cover for protecting the OSA, the substrate and the chassis.

The United States patent, U.S. Pat. No. 6,335,869, has disclosed an optical transceiver, in which the substrate is assembled with the resin made chassis only by fitting. The metal cover surrounds the chassis that fixes the OSA with a fixing member. Although the resin made chassis reduces the cost or the price of the transceiver, the heat dissipating function for components installed on the substrate might have disadvantages because the resin made chassis fixes the substrate so as to wrap the substrate. Moreover, the width of the chassis limits the width of the substrate, which also limits the area where the components may be mounted. The fixing member increases the number of components which increases the cost not only in the components themselves but also the assembly thereof.

Another United States patent, U.S. Pat. No. 6,439,918, has disclosed another configuration of the transceiver, in which the metal chassis fixes the substrate with screws. Although not restricted to the metal chassis in this configuration, the chassis is preferable to be made of metal from the viewpoint of the heat conduction. The metal chassis is inevitable to fix the substrate with screws. Moreover, the chassis includes two portions, one of which is for the optical receptacle and the other is for mounting the substrate, formed by die-casting in one body. However, the die-casting requires the post processing for protecting the die-cast metal from deteriorating, which may increase the process cost.

Thus, the conventional transceiver is inconsistent in the heat dissipating function and the production cost. The transceiver, whose dimensions are ruled by the agreement, is also inconsistent in the area capable of mounting the components and simplifying the manufacturing. Therefore, the optical transceiver according to the present invention enables to maintain the heat dissipating function and the area for mounting the components with the manufacturing thereof simpler, accordingly the cost thereof becomes lower, than the conventional transceiver.

SUMMARY OF THE INVENTION

The optical pluggable transceiver according to the present invention has a feature that the transceiver is comprised of an optical subassembly (OSA), a frame, a substrate, a heat dissipating member, and a cover for protecting these OSA, substrate, and heat dissipating member, and one surface of the heat dissipating member, in a greater part thereof, exposes from the cover. The OSA mutually converts the optical and electrical signals to each other. The substrate mounts an electronic circuit that couples in electrical with the OSA and processes the electrical signal. The heat dissipating member, made of metal, includes the first and second surfaces opposite to each other. The first surface couples in thermal with the electronic circuit on the substrate. The frame, made of resin, mounts the OSA, the substrate, and the heat dissipating member. The cover, made of metal plate, wraps the OSA, the substrate, the heat dissipating member, and the frame such that the greater part of the second surface of the heat dissipating member exposes.

In the transceiver thus assembled, the metal heat dissipating member comes in contact to the electronic circuit on the substrate in direct, or via a thermal sheet. Besides, the surface opposite to the surface touching the electronic circuit exposes outward in the greater part thereof, accordingly, the heat dissipating performance may be enhanced.

Moreover, the present transceiver assembles the OSA, the substrate, and the heat dissipating member with the frame only by fitting without any screwing or gluing. Respective members provide structures easy to assemble and hard to disassemble to each other. Accordingly, the reduction of the process cost not only due to decreasing the number of the component used in the assembly but also simplifying the process.

The OSA is also assembled with the frame by fitting, which automatically defines the relative position between the OSA and the frame. While, the heat dissipating member is determined in the position thereof along the longitudinal direction by fitting to the frame, and along the rest to directions by setting the cover to wrap the frame, the heat dissipating member, the substrate, and the OSA. The position of the OSA to the frame is necessary to follow the standard of the optical receptacle, while the substrate is necessary to satisfy the standard of the electrical plug on the substrate and the electrical connector on the host system. The fitting configuration of the present transceiver assembling the frame with the OSA and the substrate satisfies these two standards independently.

The frame includes first to fourth portions. The each portion forms an optical receptacle, mounts the OSA, installs the substrate, and forms the electrical plug, respectively. The third portion, mounting the substrate, provides an opening to expose the electronic circuit installed on the substrate. The heat dissipating member comes in contact to the electronic circuit via the opening in the third portion of the frame. By this configuration, the heat dissipating member may come in contact to the electronic circuit in wide area, while the entire opening is covered by the heat dissipating member to compensate the strength of the resin made frame.

BRIEF DESCRIPTION OF DRAWINGS

FIG. 3A is a perspective view of the heat dissipating member, FIG. 3B is a perspective view of the frame, and FIG. 3C is a side view of the frame assembled with the heat dissipating member;

FIG. 5 is a perspective diagram, which is viewed from the rear, of the frame assembled with the sub-assemblies and the substrate;

FIG. 6 schematically shows the mechanism that the rear fitting post presses the substrate forward;

DESCRIPTION OF PREFERRED EMBODIMENTS

Figure 1A:
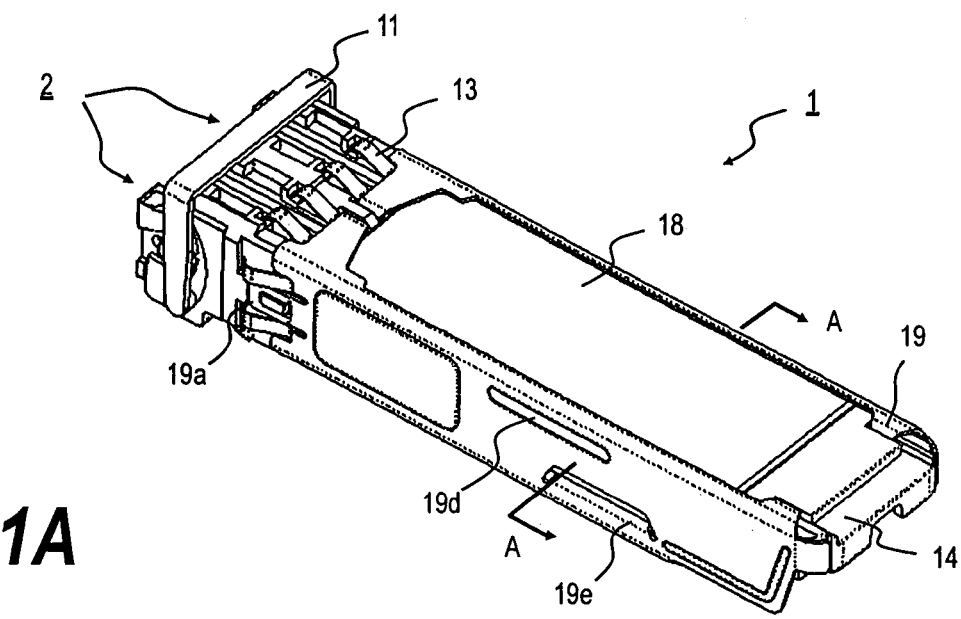
FIG. 1A is a perspective diagram viewed from the top of the transceiver.

Next, preferred embodiments of the optical transceiver according to the present invention will be described while referring to accompanying drawings. In the drawings and the explanations, the same symbols and the same numerals will refer to the same elements without overlapping explanations. The present invention provides an optical transceiver, which meets the objects to not only maintain the heat dissipating performance and ensure the widest area for mounting the components but also to reduce the number of the components by reducing the cost themselves, in addition to simplifying the assembly of the components, accordingly, to decrease the production cost thereof.

FIG. 1A is a perspective diagram of the transceiver 1 viewed from the top thereof, while FIG. 2A is a diagram viewed from the bottom. The optical transceiver 1 has a rectangular parallelepiped shape, the forward end of which forms an optical receptacle 1a, while the rear end forms an electrical plug 17a, which mates with the electrical connector mounted on the host system, provided on a substrate 17. Here, the front and the rear corresponds to a side where the optical receptacle 1a is formed and to a side opposite thereto, respectively, for the description sake. The transceiver provides, in addition to the optical receptacle 1a, the bail 11 and the actuator 12 in the front. The frame 14 installs the substrate 17 in the rear, while the forward thereof forms the optical receptacle 1a in a body as holding the actuator 12 and the bail 11. The projection 12a of the actuator 12 and a plurality of fingers of the finger member 13 exposes and protrude from the front end of the cover 19. The projection 12a comes to mate with the opening in the cage to fix the transceiver 1 to the cage. The bail 11 and the actuator 12 provide the function to release this mating between the transceiver 1 and the cage. The fingers 13a stabilize the ground potential of the transceiver 1 and provide paths for dissipating heat to the outside thereof by coming in contact to the inside of the cage when the transceiver is inserted into the cage.

Figure 2:
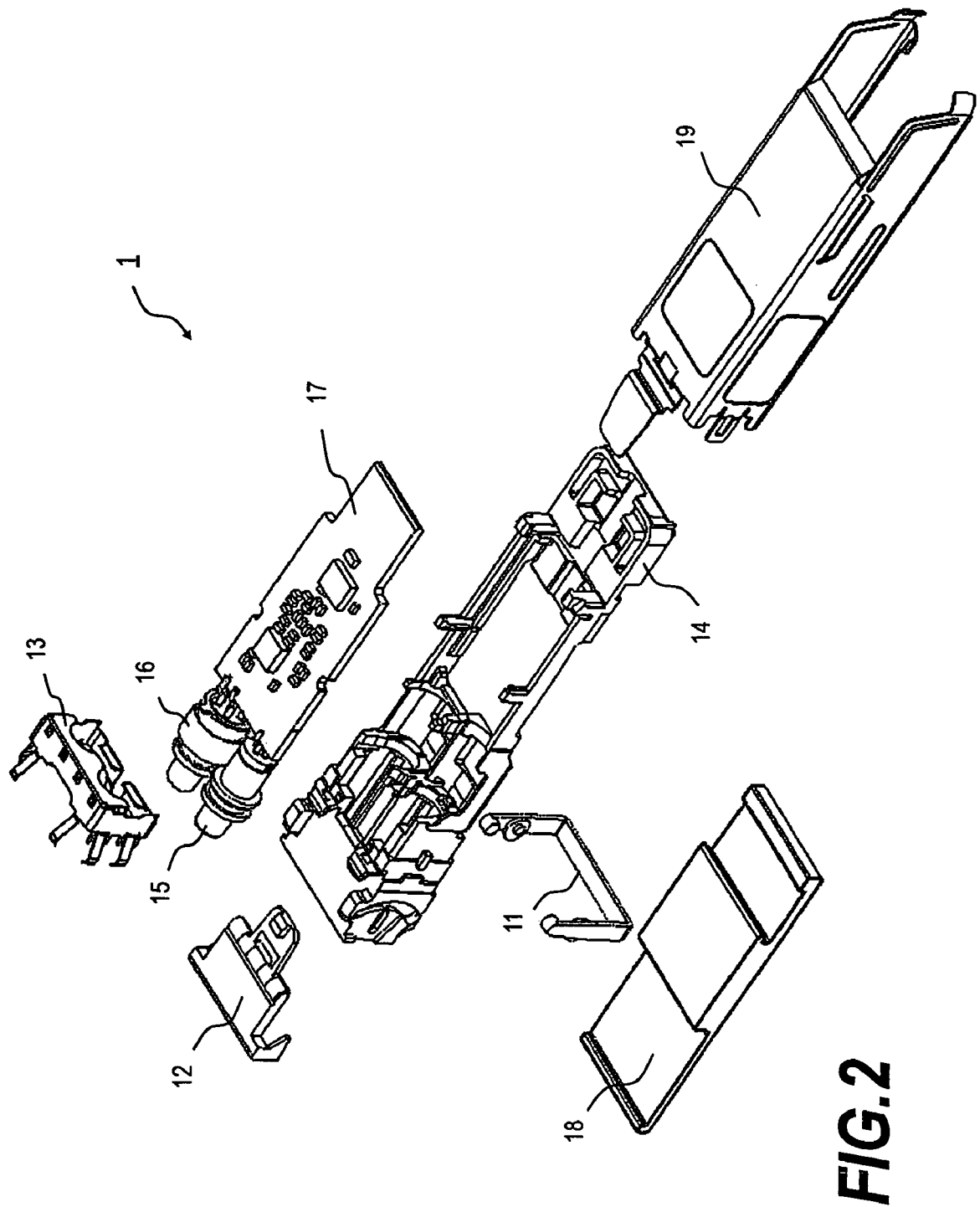
FIG. 2 is an exploded view of the transceiver according to the present invention.

FIG. 2 is an exploded diagram of the transceiver 1 viewed from the bottom thereof. Here, the bottom corresponds to a side where the bail 11 and the actuator 12 are attached thereto, while the top corresponds to an opposite side. The frame 14, made of resin, is integrated in a body with the optical receptacle 1a. The frame is plated in entire surface thereof with metal to ensure the shielding of the transceiver 1. The frame 14 assembled with the heat dissipating member 18, which has a configuration to fit to the frame 14, the bail 11 and the actuator 12 in the front side. As explained later in this specification, the substrate 17 is assembled with the frame 14 by positioning at six points after electrically connected with a transmitting optical subassembly (TOSA) 15 and a receiving optical subassembly (ROSA) by using a positioning tool. The finger member 13 is fixed to the frame by winding around the frame 14 at a position where the TOSA 15 and the ROSA 16 are installed and sliding the cover 19 to wrap the edge of the finger member 13. The cover 19 is slid from the rear to put the heat dissipating member 18, the frame 14 and the substrate 17 therein.

Next, details of the heat dissipating member 18 and the process for assembling the transceiver 1 of the present invention will be described.

Assembly of the Frame with the Heat Dissipating Member

FIG. 3A is a perspective view of the heat dissipating member 18, FIG. 3B is a perspective view of the frame 14, and FIG. 3C is a side view of the frame 14 assembled with the heat dissipating member 18.

The heat dissipating member 18, having a substantially rectangular plan view, includes first to third portions, 18a to 18c, from the front side of the transceiver 1. The second portion 18b is thicker than the other two portions, 18a and 18c. The tip of the first portion 18a forms a rib 18e, while the tip of the third portion 18c forms another rib 18f. The width of the former rib 18e is narrower than the latter rib 18f. Moreover, the rear end of the second portion 18b, i.e. at the boundary between the second and third portions, 18b and 18c, form a hooked projection 18d. As shown later, the thicknesses of these first to third portions, 18a to 18c, trace the cross-sectional shape along the longitudinal direction of the frame 14.

The heat dissipating member 18 is formed by the metal extrusion method. Metal used for the heat dissipating member 18 is preferable to have a thermal conductivity greater than 60 Wm/K, and the present transceiver applies aluminum. The cross section of the heat dissipating member 18 along the longitudinal axis of the transceiver 1 traces that of the frame 14. Die-casting or processing of sheet metals is typically applied to form components with complex structures. However, the die-casting has a disadvantage from the cost viewpoint, while the latter, the processing of the sheet metal, has inferior to ensure the flatness. The heat dissipating member 18 of the present invention is formed by the metal extrusion method, which makes the cost merit and the stiffness of the component inconsistent.

As shown in FIGS. 3A and 3C, the hooked projection 18d along the longitudinal axis of the transceiver 1 mates with the overhang in the cross section thereof, which realizes the fitting configuration. However, the heat dissipating member 18 is not fixed along the transverse direction. By setting the cover 19 to put the frame 14 and the heat dissipating member 18 therein, and by fixing the cover 19 to the member 18, the heat dissipating member 18 is fixed to the frame 14. The cover 19 exposes the top of the transceiver 1, namely, the top of the transceiver 1 exposes the surface 18h of this heat dissipating member 18.

The frame 14, formed by the injection molding, includes first to fourth portions, 14a to 14d, from the front side to the rear side. The first portion 14a forms two optical receptacles 1a, each corresponding to the optical transmission and the optical reception, respectively. The inner dimension of the receptacle 1a is strictly decided by the standard of the optical connector to mate with this receptacle 1a. The second portion 14b mounts the TOSA and the ROSA, 15 and 16. On the top of this second portion 14b is formed with two openings, 141 and 142, to bury thermal sheets to couple the OSAs, 15 and 16, in thermal with the first portion 18a of the heat dissipating member 18. The thermal sheets, which are not shown in figures, may thermally couple the OSAs, 15 and 16, with the member 18 by ensuring the heat dissipation path from the stem, 15c and 16c, which mount the semiconductor devices thereon, to the heat dissipating member 18. Between the first and second portions, 14a and 14b, forms a projection 14g in the side thereof to latch the cover 19. By engaging this projection 14g with the opening provided within the latch tab 19a, the cover 19 is latched with the frame 14.

The third portion 14c mounts the substrate 17 thereon. That is, the third portion 14c provides the first type of post, 14e and 14f, for engaging with the substrate 17 and the other type of post 14h for abutting against the substrate 17. As shown in the later, to fit notches and steps formed in respective sides of the substrate 17 to these posts, 14e, 14f and 14h, fixes the substrate 17 to the frame 14. The fixing is carried out only by the fitting those posts in the frame 14 to corresponding structures in the substrate 17, without any screws or adhesive.

The bottom surface 18g of the second portion 18b of the heat dissipating member 18 comes in contact to the component, such as ICs, mounted on the substrate 17 via a thermal sheet, which ensures the heat dissipating path from the IC to the member 18. Between the third and fourth portions, 14c and 14d, is formed with an overhang 14m to fix the heat dissipating member 18 to the frame 14. The hooked projection 18d engages with this overhang 14m, which assembles the heat dissipating member 18 with the frame 14. The position of the heat dissipating member 18 along the longitudinal direction is defined by two ribs, 18e and 18f, while the up-and-down direction thereof is defined by putting the frame 14 and the member 18 within the cover 19 after temporally engaging this hooked projection 18d with the overhang 14m.

The fourth portion 14d forms a groove 14k to engage with the rib 18f in the rear end of the heat dissipating member 18, while between the first and second portions, 14a and 14b, is formed with another groove 14l to receive the rib 18e in the front end of the member 18. The heat dissipating member 18 is assembled with the frame 14 by sliding thereof along the transverse direction of the transceiver 1 as two ribs, 18e and 18f, insert into corresponding grooves, 14l and 14k, and the hooked projection 18d mates with the overhang 14m. As shown in later, the top surface 18h of the heat dissipating member 18 exposes outside even after setting the cover 19. Accordingly, the radiative efficiency to the cage may be maintained. Moreover, some cages occasionally provide a movable fin for radiating the heat, the heat dissipating member 18 of the present transceiver may come in directly contact to such movable fin, which realizes the most effective heat dissipating function. In the explanation above, the assembly of the heat dissipating member 18 with the frame 14 is carried out in advance to that of the substrate with the frame 14. However, it may be applicable to assemble the heat dissipating member 18 with the frame 14 after the assembly of the substrate 17 with the frame 14.

Assembly of the Substrate with the Frame

Figure 4:
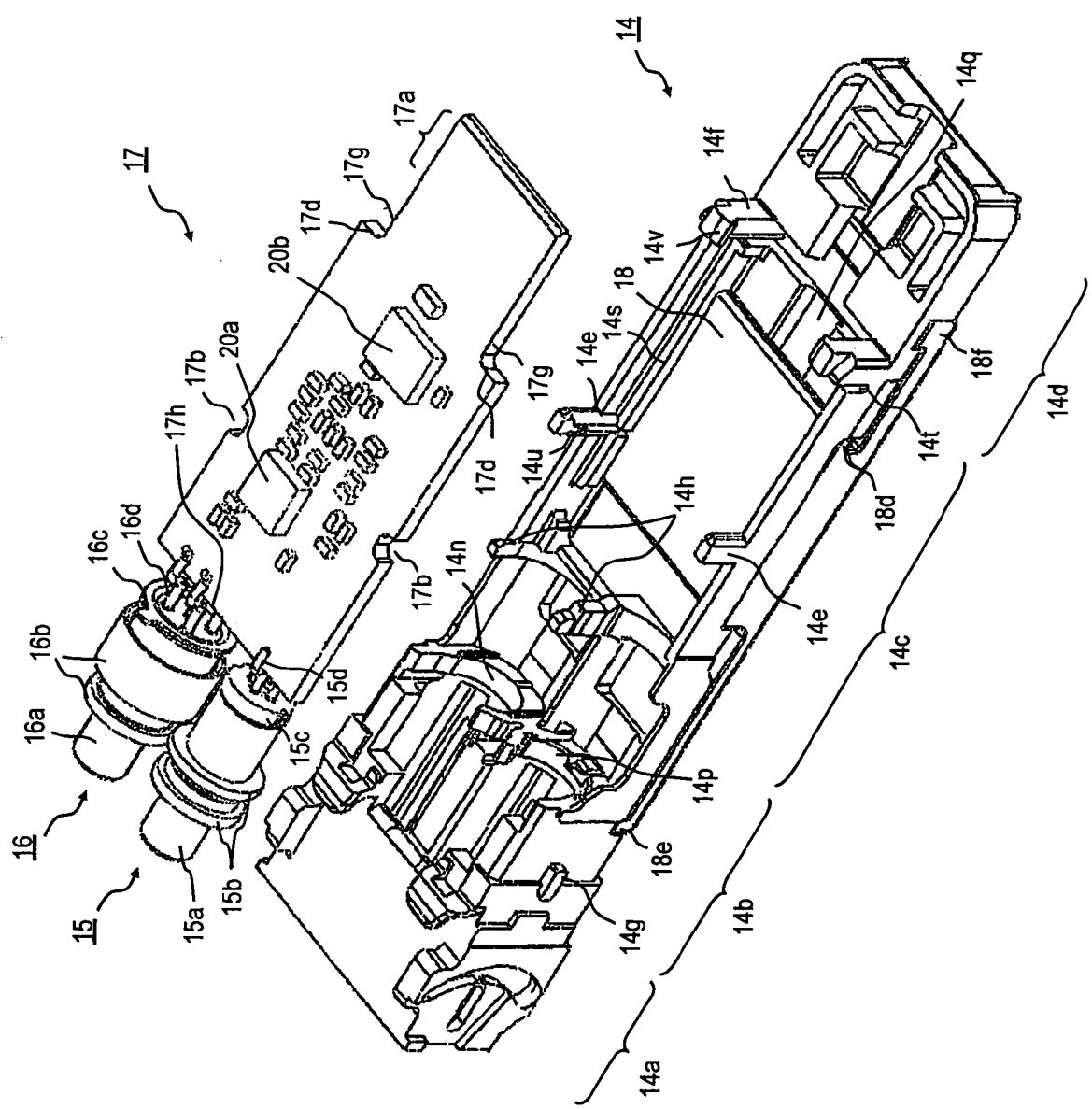
FIG. 4 shows a process for assembling the substrate, which is built with the sub-assemblies, with the frame.

The assembly of the frame 14 with the substrate 17 is performed by four fitting mechanisms and two positioning mechanisms. FIG. 4 shows the process of this assembly. In FIG. 4, the frame 14 provides the heat dissipating member 18 in advance to the assembly with the substrate 17.

First, the substrate 17 is connected to the OSAs, 15 and 16, before assembled with the frame 14. The OSAs, 15 and 16, each provides the sleeve, 15a and 16a, in the front side thereof, while the stems, 15c and 16c, in the rear side thereof. The stem, 15c and 15c, extrudes a plurality of lead pins, 15d and 16d, in rearward to connect to the corresponding electrode on the substrate 17 in electrical. On the stem, 15c and 16c, is installed with a laser diode (LD) for the TOSA 15, while, for the ROSA, the stem 16c installs a photodiode (PD) and a preamplifier for amplifying electrical signal generated by the PD. On the root of the sleeve, 15a and 16a, is formed with a pair of flanges, 15b and 16b, which positions the OSAs, 15 and 16, with respect to the frame 14 along the longitudinal direction by sandwiching the walls, 14n and 14p, formed in the second portion 14b.

The substrate 17 has a width substantially equal to that of the transceiver 1. Although not explicitly shown in FIG. 4, the rear end thereof forms a plurality of electrodes for the electrical plug 17a. On both sides of the substrate 17 are formed with notches 17b, and steps 17d. These four structures and the front end 17h determine and position the substrate 17 on the frame 14. The substrate 17 mounts a plurality of ICs, 20a and 20b, resistors, and capacitors. Although not shown in FIG. 4, the opposite surface of the substrate 17 also mounts the IC 20c and some electrical components. As shown in later, the heat dissipating member 18 may thermally couple with the IC 20c mounted on the opposite surface facing the member 18.

The frame 14 forms the first type of posts, 14e and 14f, in the side of the third portion 14c and in the side between the third and forth portions, 14c and 14d, respectively. Further, the frame 14 forms the second type of posts 14h in the center and the side at the boundary between the second and third portions, 14b and 14c. Since the outside dimension of the substrate 17 inherently accompanies with a tolerance of around 0.1 mm, these posts are required, in order to anchor the substrate as ensuring the enough engaging strength, to be tall enough to deform and to compensate such tolerance, when the substrate 17 is to be fit to the frame 14. However, the multi source agreement (MSA) concerning to this transceiver rules the height thereof, accordingly, the post is limited in the height thereof and does not provide an enough margin to fit the substrate 17. In the present transceiver 1, the first type of post 14e formed in the forward accompanies with a beam 14s beneath the post 14e and, by deforming this beam 14s in torsional, the post 14e deforms enough to compensate the tolerance and to ensure the engaging force with the substrate 17.

For instance, when the beam 14s has a cross section of 2.4 mm in the height by 0.8 mm in the width, and is made of resin with a modulus of the transverse elasticity and an allowable shearing stress being 48 MPa and 80 MPa, respectively, the post 14e can be deformed by 0.5 mm in the tip thereof for the length of the post 14e of 4.5 mm by configuring the beam length longer than 3 mm in both of the front and the rear of the post 14e. That is, the engaging length can be ensured greater than 0.5 mm.

For the post 14f in the rear side of the transceiver 1, the frame 14 forms, in a center thereof, a groove 14q with a thinner wall to deform the post 14f enough when the substrate 17 is fit into the frame 14. That is, by bending at this groove 14q, the distance between the posts 14f may be widened to fit the substrate 17, which reduces the resistant force for the insertion of the substrate 17 and enhance the productivity. By setting the rear of the substrate 17 as abutting the front edge 17h against the second type of posts 14h, the notch 17b engages with the post 14e and the side 17g of the step 17d is fit in the side of the other post 14f.

On the other hand, for the longitudinal direction of the substrate 17, by abutting the other surface of the post 14f against the step 17d, the substrate 17 may be put between the first type of post 14f and the second type of post 14h. The tip of respective posts, 14e and 14f, form hooks, 14u and 14v, accordingly, once set the substrate 17 to the posts, 14e and 14f, the substrate 17 is hard to disassemble with the frame 14.

FIG. 5 illustrates the frame 14 assembled with the substrate 17 viewed from the rear. The first type of posts, 14e and 14f thereto, sandwich the substrate 17 and influence the resilient force by the deformation of the frame 14. Further, both sides 14w of the rear groove 14q shapes in arc to provide a room to bend the frame 14 so as to expand the distance between posts 14f, which makes it easy to set the substrate 17 in the frame 14.

FIG. 6 illustrates the mechanism to fix the substrate 17 to the frame 14 along the longitudinal direction. The substrate 17 is set to the frame 14 as pressing the post 14f rearward. Once setting to the frame 14, the post 14f presses the substrate 17 forward, which fixes the substrate 17 tithe frame 14. Specifically, the post 14f leans forward by about 0.2 mm before receiving the substrate 17. After setting the substrate 17 as abutting the front edge 17h thereof against the second type of post 14h, the post 17f deforms to the shape shown in FIG. 6, i.e., substantially perpendicular to the primary surface of the frame 14. In this position, the post 14f presses the substrate 17 by;

$$F=3EI\epsilon/L^3.$$

Where E and I are Young's modulus and the second moment of area of the resin material of the frame 14, respectively, $\epsilon$ is the displacement, and L is the height of the post. By setting the height L and the cross section of the post 14f not to exceed the permissible stress for the displacement $\epsilon$, the magnitude of the force to press the substrate 17 forward may be optionally determined. Moreover, the present optical transceiver 1 provides a groove 14t just front of the post 14f to adjust the height thereof.

The optical transceiver 1 thus configured may install the substrate 17 only by the frame 14 without any other components. Moreover, (1) to hold the substrate 17 in flexible along the longitudinal direction may relax the thermal stress due to the discrepancy in the linear expansion between the substrate 17 and the frame 14, (2) the substrate 17 once set on the frame 14 does not loose and has an improved positional accuracy because the substrate 17 is held by the frame 14 such that the post 14e puts the substrate 17 along the transverse direction while the other posts 14f sandwiches the substrate 17 along the transverse direction and, cooperated with the post 14h, along the longitudinal direction, and (3) the thermal sheet may be put between the heat dissipating member 18 and the IC 20c because the substrate 17 is assembled with the frame 14 only by fitting.

Assembly of the OSA with the Frame

Figure 7A:
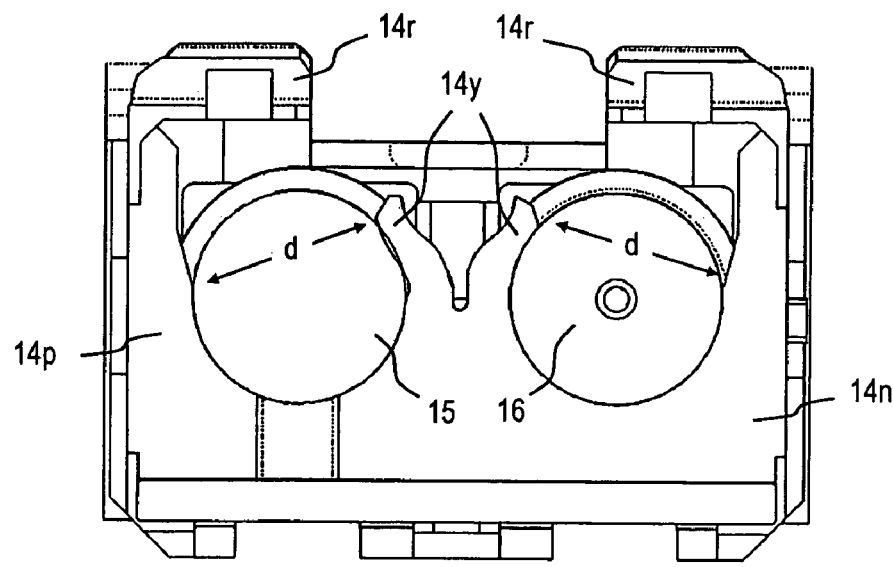
FIG. 7A is a cross section showing the sub-assemblies mounted on the frame.
Figure 7B:
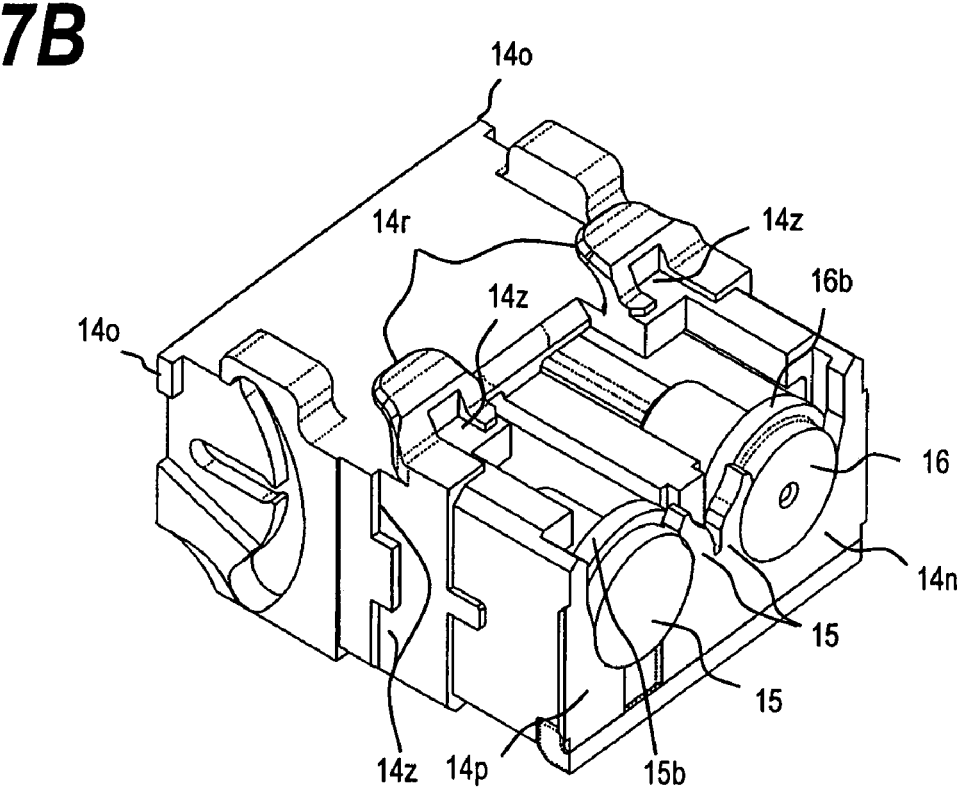
FIG. 7B is a perspective view of the frame and the sub-assemblies mounted on the frame.

The transceiver 1 of the present invention enhances the productivity by assembling the OSA with the frame 14, similar to the assembly of the substrate 17 with the frame 14, only by fitting without any member to fix the OSAs, 15 and 16, to the frame 14 such as a holder. FIGS. 7A and 7B illustrates the OSAs, 15 and 16, assembled with the frame 14, in a cross section thereof (FIG. 7A) and a perspective view (FIG. 7B). These figures, FIGS. 7A and 7B, correspond to those viewing forward from the partition walls, 14n and 14p, in FIG. 4. The wall, 14n and 14p, form a finger 14y. The OSAs, 15 and 16, having a cylindrical shape, are fit to the preset positions from the upper in the drawing, from the bottom side of the transceiver 1 in the practical configuration. The gap d between the finger 14y and wall facing thereto is slightly smaller than the diameter of the grip portion between two flanges, 15b and 16b. The OSAs, 15 and 16, may be set into the position because not only the grip portion thereof expands this gap d but also the distance between two OSAs, 15 and 16, may be widened within the flexibility of the lead pins, 15d and 16d. Moreover, the OSAs, 15 and 16, once set in the frame 14 are hard to disassemble as long as the gap d is manually expanded even the frame 14 with OSAs, 15 and 16, is held in upside-down, because the finger 14y recovers its original position due to the resilient characteristic of the resin member of the frame 14.

The longitudinal position of the OSA may be determined by sandwiching the partition wall, 14n and 14p, with the flanges, 15b and 16b. As shown in later, the finger member 13 is inserted between a gap between this wall, 14n and 14p, and the rear flange, 15b and 16b. Thus, the OSA is automatically positioned and fixed with respect to the frame 14 without any additional components.

Assembly of the Finger Member

Figure 8A:
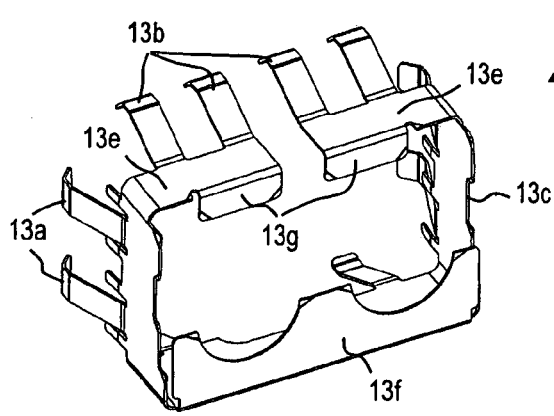
FIG. 8A and FIG. 8B are perspective diagrams viewed from the rear top and from the top bottom, respectively.
Figure 8B:
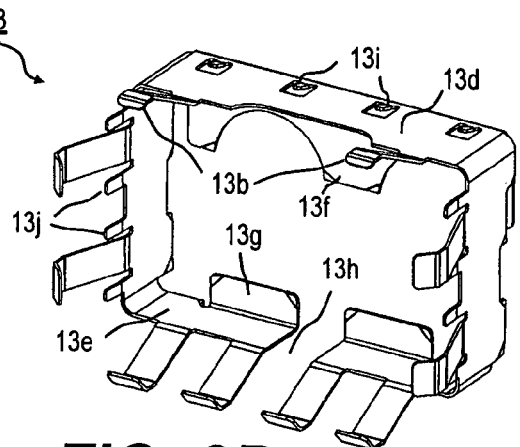
Figure 8C:
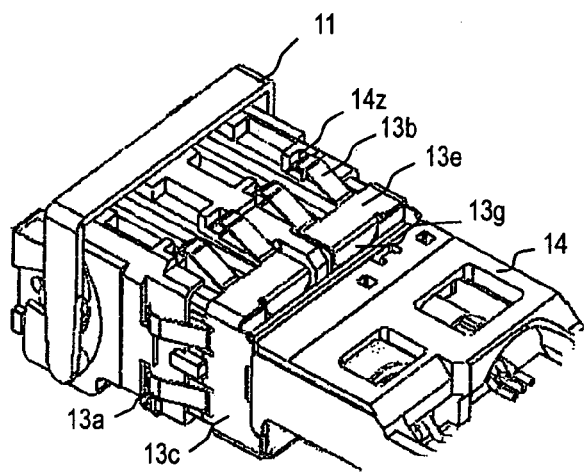
FIG. 8C and FIG. 8D are perspective diagrams of the finger member assembled with the frame viewed from the top and from the bottom, respectively.
Figure 8D:
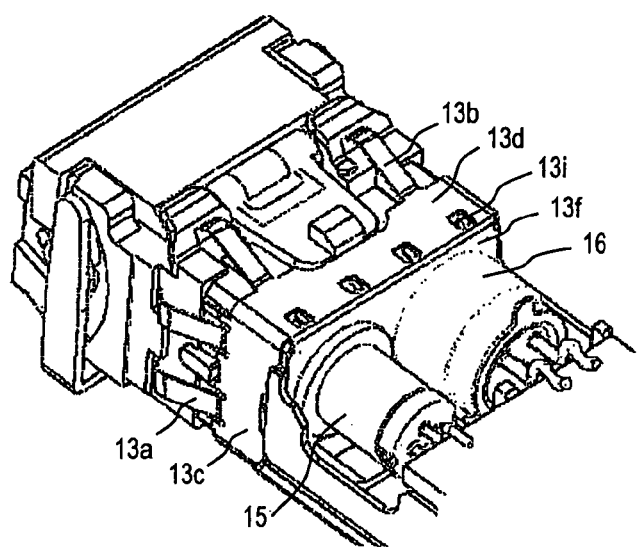

FIG. 8A is a perspective drawing viewed from the front of the finger member 13, while FIG. 8B is a perspective drawing viewed from the rear. The finger member 13, made of stainless sheet with a thickness of about 0.1 mm only by cutting and bending, includes four sides, 13c to 13e, forming a box with a slit 13h in one side 13e. A plurality of fingers 13a protrudes from the side 13c, and other fingers 13b protrude from the bottom 13d. Here, FIG. 8B and FIG. 8D illustrates the finger member 13 in upside-down The bottom 13d is bent inward to form the piece 13f at a side opposite to that protruding the fingers 13b, while, the top 13e is also bent inward to form the piece 13g. The width of the top 13e is narrower than that of the bottom 13d. As described in later, these two pieces, 13f and 13g, are sandwiched between frames 14 and between the frame and the heat dissipating member 18, respectively, to fix the finger member 13 to the frame 14. Moreover, the bottom 13d provides a plurality of projective tabs 13i, and the side 13c forms, in addition to the finger 13a, a plurality of supplemental fingers 13j. These projective tabs 13i and supplemental fingers 13j come in contact to the cover 19, which effectively shields the transceiver 1 by increasing a count of contact.

In order to ensure the firm contact to the cage and to enhance the EMI shield, the finger member 13 should be short as possible in the finger thereof in addition to increase the count of the finger. Accordingly, the present transceiver 1 provides the finger member 13 that has a plurality of fingers, 13a and 13b, independent of the cover 19, and the finger member 13 surrounds the optical receptacle 1a except the region the bail 11 and the actuator 12 are attached thereto. Moreover, since the resin frame 14 is plated with metal, multi-layered nickel (Ni) and gold (Au), in entire surface thereof, the frame 14 may be grounded by the fingers, 13a and 13b, coming in contact to the cage.

The tip of the finger, 13a and 13b, bends inward, which may escape the transceiver 1 from the positional interference. That is, the optical hub system has been developed, in which a plurality of transceivers is arranged in high density, with a span substantially equal to the width and the height of the transceiver. When the transceiver is installed in such densely arranged system, i.e., is inserted into or removed from the densely arranged cage, the fingers may disturb the insertion or the extraction of the transceiver, occasionally, the fingers may be broken by hooking the edge of the cage.

The finger member 13 of the present transceiver 1 provides a plurality of fingers, 13a and 13b. This ensures the firm electrical contact to achieve the stable shield performance because a plurality contact can be realized for any combination of the finger member 13 and the cage, even when the dispersion in the physical dimension exists. The cage is formed by bending a metal sheet, which may be easily deformed by the insertion and the extraction of the transceiver. For such deformed cage, a plural electrical contact between the finger member 13 and the cage can be realized by providing a plurality of fingers. Moreover, the present finger member 13 is made of stainless sheet with a thickness of around 0.1 mm and is bent to show the resilient characteristic similar to a leaf spring. Accordingly, nearly all fingers can come in contact to the deformed cage. The bend of the fingers, 13a and 13b, is 1 mm or more.

The finger member 13 is assembled with the frame 14 to surround the second portion 14b. That is, referring to FIGS. 8C and 8D, the flange, 15b and 16b, of the OSA puts the piece 13f of the finger member 13 between the partition wall, 14n and 14p, as shown in FIG. 8C, while other pieces 13g bent from the top side 13e is inserted into a gap between the heat dissipating member 18 and the frame 14 at the top of the transceiver 1. Although the heat dissipating member is not illustrated in FIG. 8B, the member 18 is set to the frame 14 so as to sandwich the piece 13g between the frame 14. By enlarging the slit 13h, the finger member 13 may be assembled with the frame 14 to surround the second portion 14b thereof. The finger member 13 may recover in its original shape shown in FIGS. 8A and 8B after the setting by the elasticity intrinsically attributed in the material. Moreover, setting the cover 19 to the frame 14, the cover 19 wraps the four sides, 13c to 13e, of the finger member 13, accordingly, the member 13 does not loose. The finger member 13 provides a plurality of projective tabs 13i and a plurality of supplemental fingers 13j to ensure the firm contact between the cover 19.

The tip of respective fingers, 13a and 13b, extending outward is bent inward. i.e., a portion protruding outward comes in contact to the inside of the cage. When the transceiver is set within the cage, these fingers, 13a and 13b, are extruding from the edge of the cage. Accordingly, a point between this bent portion and the root of the fingers comes in contact to the edge of the opening of the cage not to the inside of the cage, which avoids the positional interference between the opening formed in the sides of the cage or the latch also formed in the sides thereof to come the cage in electrical contact to the face panel of the host system, which secures the firm and stable contact between the cage and the fingers. Tapping to protrude the center of the fingers, 13a and 13b, outwardly may be applicable to accomplish further stable contact to the cage. The tip of the finger, 13a and 13b, the head portion beyond the bent portion, is set within the hollow 14z. As illustrated in FIG. 7B, the bottom of the frame 14 provides two hollows 14z in both side portions thereof, while the sides of the first portion 14a forms another hollow 14z to receiver the tip of the finer 13a. By setting the tip of the fingers, 13a and 13b, it is prevented for the finger to be peeled off and deformed by accidental force.

Assembly of the Bail and the Actuator

The releasing mechanism for the transceiver 1 of the present invention enables to access the bail 11 not only from the top of the transceiver 1 but also from the bottom thereof. That is, by setting the releasing position of the bail 11 to the center of the optical receptacle, while the latching position not only to the top but also to the bottom of the receptacle, it is achieved to operate the bail in ease even when the transceiver 1 is set in the densely arranged cage.

Figure 9A:
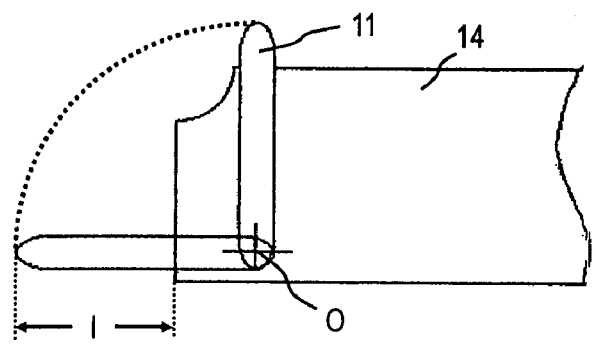
FIG. 9A schematically shows the rotational mechanism of the first conventional combination of the bail and the frame.
Figure 9B:
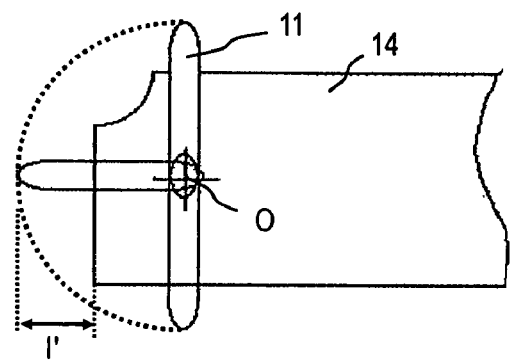
FIG. 9B is a second rotational mechanism of the bail and the frame.

However, in the case that both the top and bottom positions correspond to the latching position with the rotational center of the bail 11 being in the middle of the receptacle as shown in FIG. 9B, which corresponds to the releasing position, the room protruding in the front of the receptacle to grip the bail 11 is compelled to narrow compared to the case that the latching position is set only in the top or the bottom by setting the rotational center of the bail 11 close to the bottom or the center of the receptacle, as shown in FIG. 9A, which causes a troublesome action when the transceiver 1 is released from the cage. Although the lengthened bail 11 expands the room to grip the bail when the rotational axis is set in the middle of the receptacle, this also expands the movable range of the bail 11, which accordingly reduces the installation density. Moreover, the agreement that rules the outer dimension of the transceiver 1 defines that the length protruding from the cover in the vertical direction is smaller than 2 mm.

On the other hand, to set the center of the rotation close to the edge of the receptacle may widen the room to grip the bail 11. However, due to the specification of the optical plug to be inserted in to the optical receptacle, the center of the rotation is necessary to be formed apart from the edge of the receptacle. Thus, the room to grip the bail 11 is ensured only 2.5 mm by the configuration to assume both the top and the bottom to be the latching position shown in FIG. 9A compared to the case that only the top is the latching position shown in FIG. 9B, which ensures the room 1 to grip the bail 11 substantially 6 mm.

Figure 10:
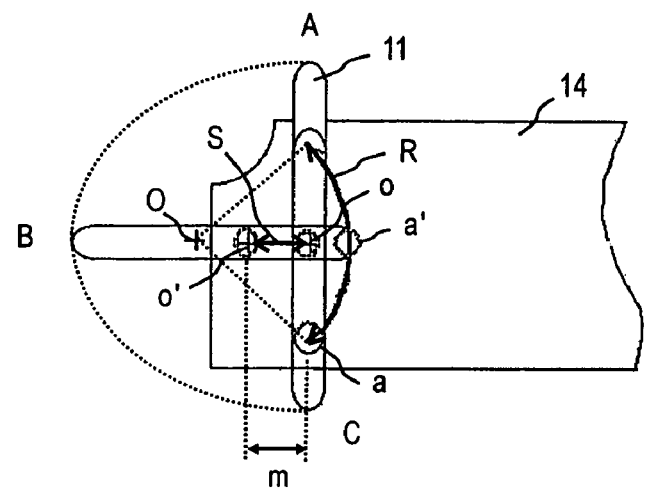
FIG. 10 schematically shows the rotational mechanism of the bail and the frame according to the present invention.

FIG. 10 is a schematic diagram explaining the present mechanism of the bail 11. The bail 11 sets three positions, A, B, and C, corresponding to the top, the center and the bottom of the receptacle, respectively. The bail 11 provides two guide projections, "a" and "o", respectively. The former projection "a" may slide along the groove R, while the latter projection "o" may slide along the groove S. The groove R constitutes, in the present embodiment, a portion of the arc with the center "O" positioning on the virtual line extending the groove S outward.

Specifically, when the bail 11 is in the position A, in the top of the transceiver 1, the guide projection "a" is set in the bottom of the groove R, while the other guide projection "o" is set in the rear end of the groove S. Rotating the bail 11 to the position B, in the front of the receptacle, the guide projection "a" slides within the groove R to the rear end "a'", while the other projection "o" slides within the groove S to the front end "o'". Comparing the case that the bail 11 rotates around the guide projection "o", the bail 11 extrudes from the front of the receptacle by the length the guide projection "o" sliding within the groove S. Further rotating the bail 11 to the bottom position C of the receptacle, the guide projection "a" positions in the top within the groove R, while the other guide projection "o" positions in the rear end within the groove S again. The positions A and B make a symmetrical relation.

In the present mechanism of the bail 11, both the top and the bottom of the receptacle provide the latching position. Besides, the bail 11 protrudes from the front of the receptacle by the length m, which corresponds to the length the second guide projection "o" slides within the groove S and is greater than the case that the bail 11 rotates around the static projection "o". Accordingly, even when the cage is densely arranged in the host system, the bail 11 may be handled in ease.

The description above as referring to FIG. 10 is based on the arched groove R. However, the liner groove R, which makes a T-shaped configuration with the groove S, may show the same function as the description above. When the linear groove R continues to the other linear groove S, the bail 11 would be movable in up and down at the latching positions A and C. When the linear groove R is apart from the linear groove S at the neck position, the rattle motion at the latching positions, A and C, can be prevented but the bail 11 can not stand in vertical to the receptacle. As long as two grooves, R and S, are isolated to each other and the initial position for the first guide projection "a" makes a vertical position against to the initial position for the second guide projection "o", the configuration of the groove R is not restricted to an arched shape.

FIGS. 11 to 13 correspond to the positions, A to C, of the bail 11 in FIG. 10, respectively, and each shows the appearance of the bail 11, the actuator 12, and the front portion of the frame 14. Next, the releasing mechanism of the present transceiver 1 will be explained as referring to drawings from 11A to 13B.

Figure 11A:
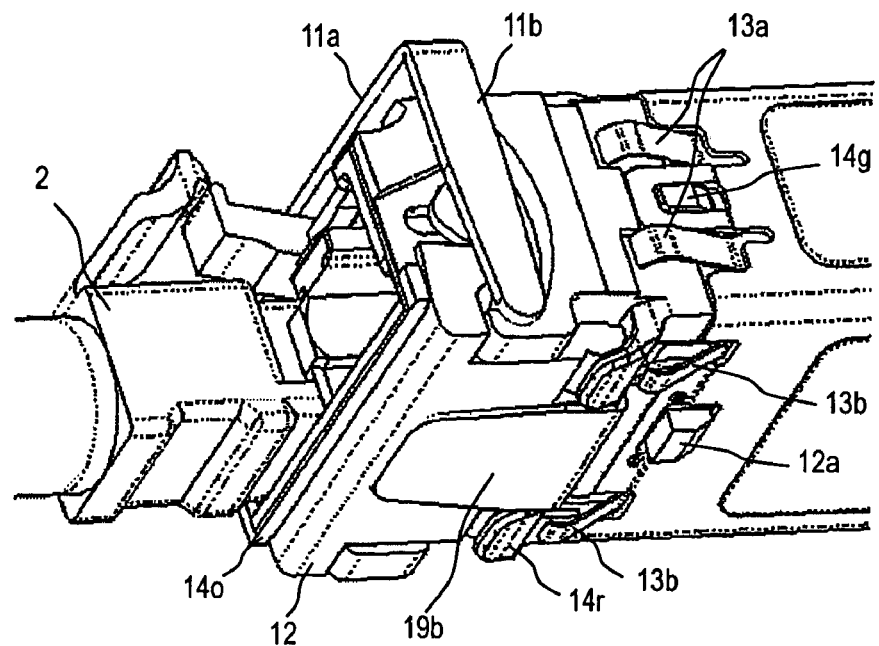
FIG. 11A is a perspective view of the bail and the actuator of the present invention when the bail is in the top of the optical receptacle.
Figure 11B:
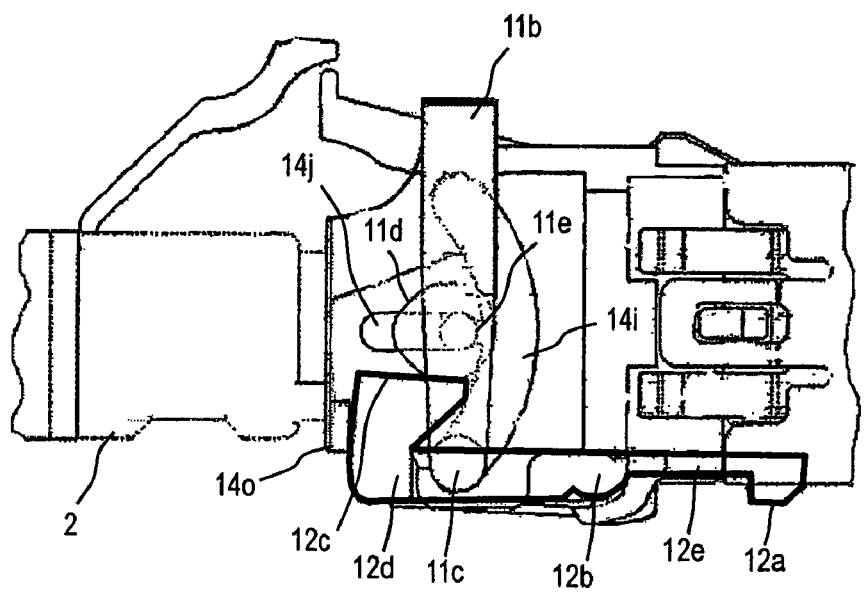
FIG. 11B is a side view showing the same situation of the bail as FIG. 11A.

FIG. 11A is a perspective view showing the bail 11 in the top latching position A, while FIG. 11B is a side view thereof. In these drawings, one of the receptacles 1a receives an optical connector 2. The bail 11 comprises a pair of leg portions 11b and a grip 11a connecting the leg portions 11b, and the bail 11 has a U-shaped configuration. The bail 11 may be made of metal or resin. The present transceiver 1 provides the bail 11 formed by the metal die-casting. On a center of the leg portion 11b is provided with a cam 11d and the first guide projection 11e stacked on the cam 11d with a center thereof identical to each other, while the tip portion of the leg 11b forms the second guide projection 11c so as to face the projection in the other leg 11b. On the outer side wall of the first portion 14a of the frame 14 is formed with the sliding groove 14j, which corresponds to the linear groove S in FIG. 10, to receive the first guide projection 11e and the second sliding groove 14i, corresponding to the arched groove R in FIG. 10, to receive the second guide projection 11c. The bail 11 may rotate in the front of the receptacle as respective guide projections, 11c and 11e, slide within two grooves, 14j and 14i, respectively.

The actuator 12, assembled with the frame 14 by fitting the center 12b thereof into the hooked projection 14r, comprises two arm portions, 12e and 12d, putting the center 12b therebetween. On the tip of the rear arm 12e is formed with a latching projection 12a that engages with the cage, while the front arm 12d provides a sliding surface 12c. The entire actuator 12 is supported from the downward by the support fin 19b of the cover 19 that extends from the front end. When the bail 11 is in the top latching position A, the minor surface of the cam 11d, which is attributed to a minor axis, comes in contact to the sliding surface 12c. In this position, since the front arm 12d is always pushed up by the support fin 19b, the sliding surface 12c is in the highest position, while the latching projection 12a in the other end of the actuator 12 is in the lowest position, protruding outward in the maximum, to engage with the cage.

Figure 12A:
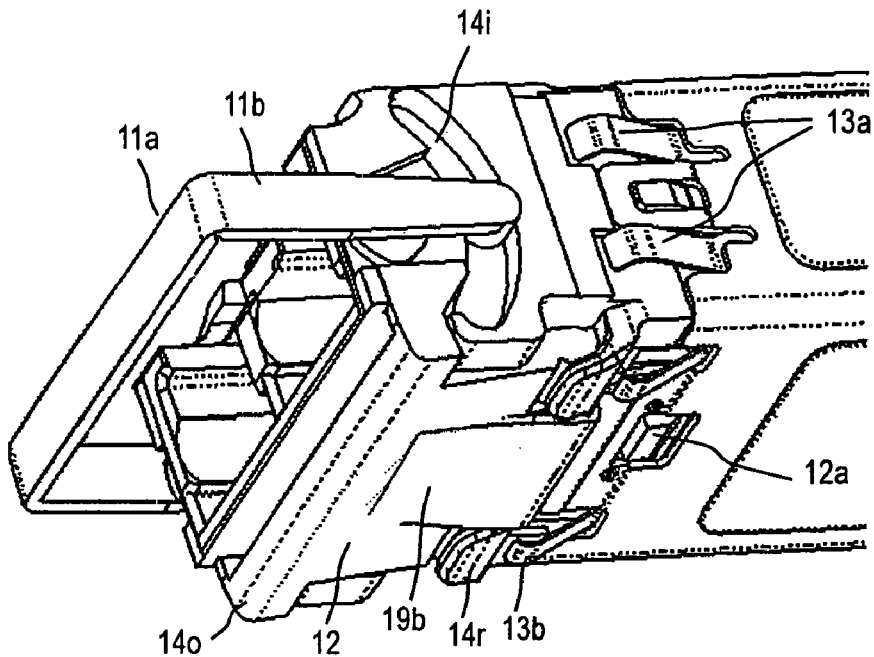
FIG. 12A is a perspective view of the bail and the actuator when the bail is in the front of the optical receptacle.
Figure 12B:
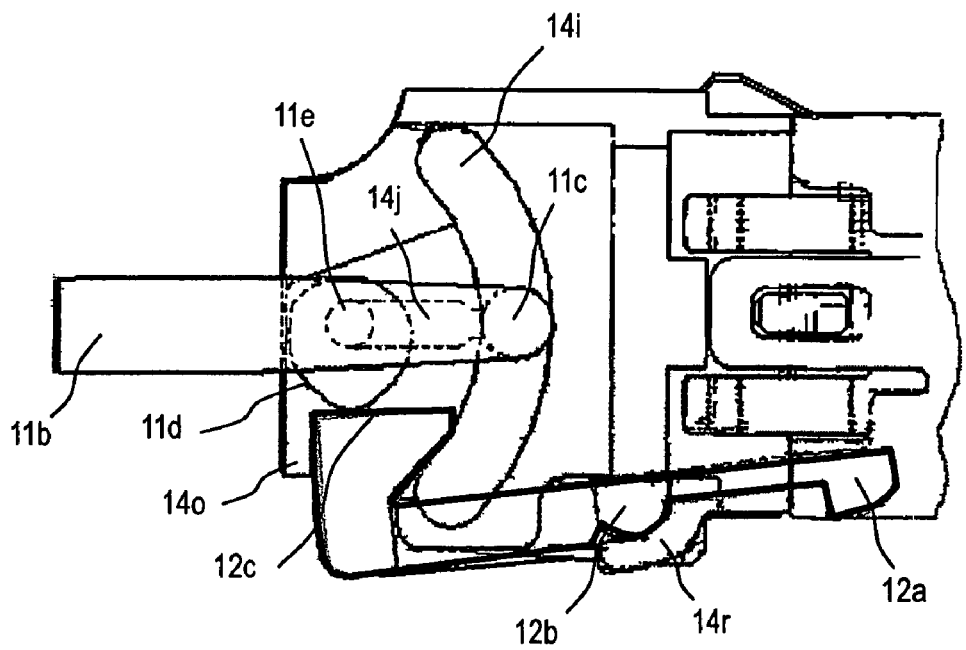
FIG. 12B is a side view showing the same situation of the bail as FIG. 12A.

Rotating the bail 11 to the releasing position B, in the front of the receptacle, FIG. 12A shows a perspective view, while FIG. 12B shows a side view of the relation between the bail 11 and the actuator 12, in this releasing position. The first guide projection 11e slides within the first groove 14j to the front end thereof, while the second guide projection 11c moves to the middle of the second sliding groove 14i. Accordingly, the grip 11a of the bail 11 further protrudes by this sliding length of the first guiding projection 11e, which enables to handle the grip 11a in ease even in the densely arranged cages.

In this position, the cam 11d comes in contact to the sliding surface 12c of the actuator 12 in the major surface, which is attributed to a major axis, to push down the actuator 12 in the maximum. Accordingly, the latching projection 12a formed in the tip of the rear arm 12e is pulled inward to the frame 14 to release the engagement of the projection 12a with the cage.

Figure 13A:
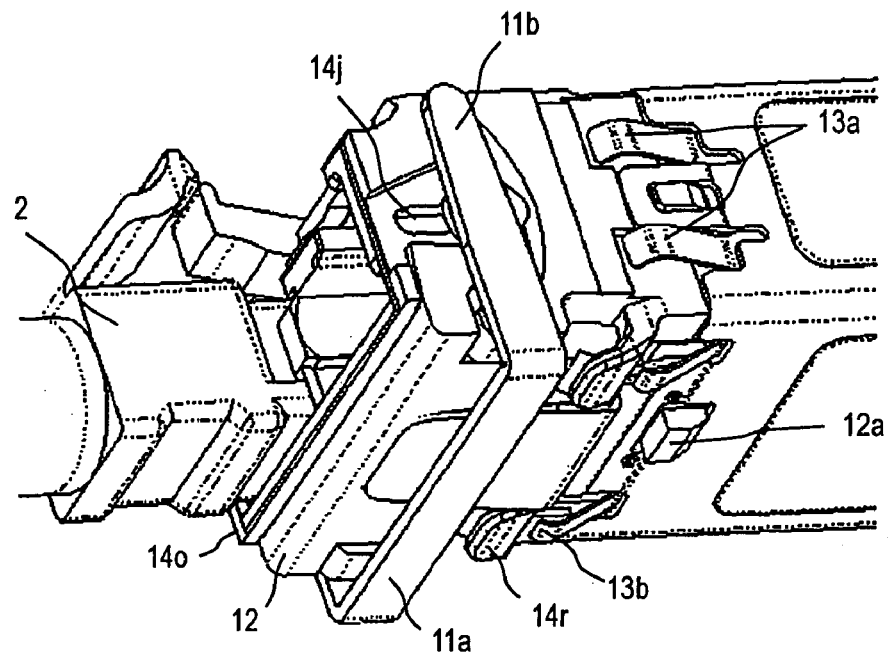
FIG. 13A is a perspective view of the bail and the actuator when the bail is in the bottom of the optical receptacle.
Figure 13B:
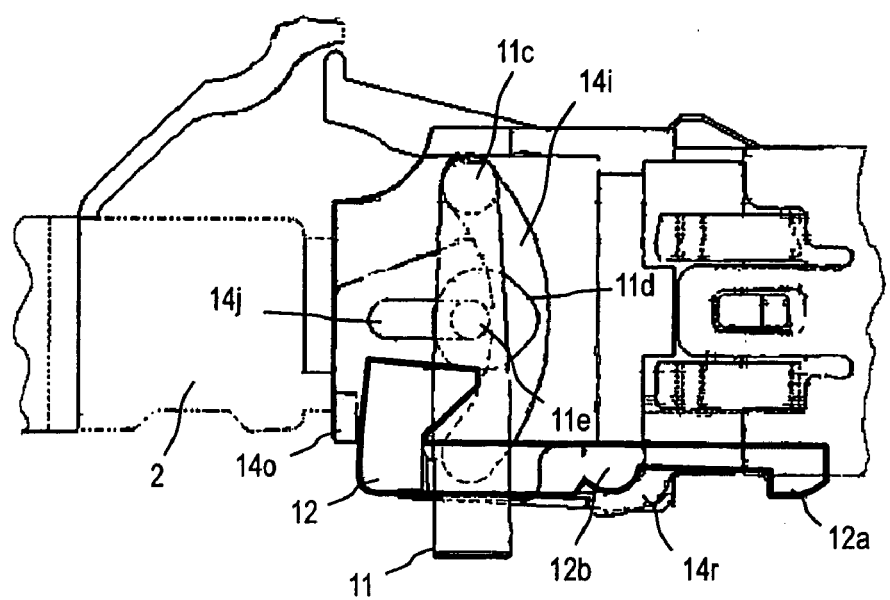
FIG. 13B is a side view showing the same situation of the bail as FIG. 13A.

Further rotating the bail 11 to the bottom latching position C, which is shown in FIG. 13A in a perspective view and FIG. 13B in a plan view, the first guide projection 11e slides to the rear end of the first sliding groove 14j while the second guide projection 11c slides to the topmost within the second guiding groove 14i. Moreover, the minor surface of the cam 11d comes in contact to the sliding surface 12c, accordingly, the latching projection 12a protrudes outward in the maximum to engage with the cage.

During the rotation of the bail 11, the actuator 12 is supported from the downward by the support fin 19b such that the actuator 12 is not disassembled with the frame 14. On the other hand, for the front and back motion of the actuator 12, the hooked projection 14r restricts the backward motion while the projection 14o formed in the front side of the frame 14 restricts the frontward motion of the actuator 12. Accordingly, only the seesaw motion is allowed for the actuator 12 once set in the predetermined position.

Figure 14:
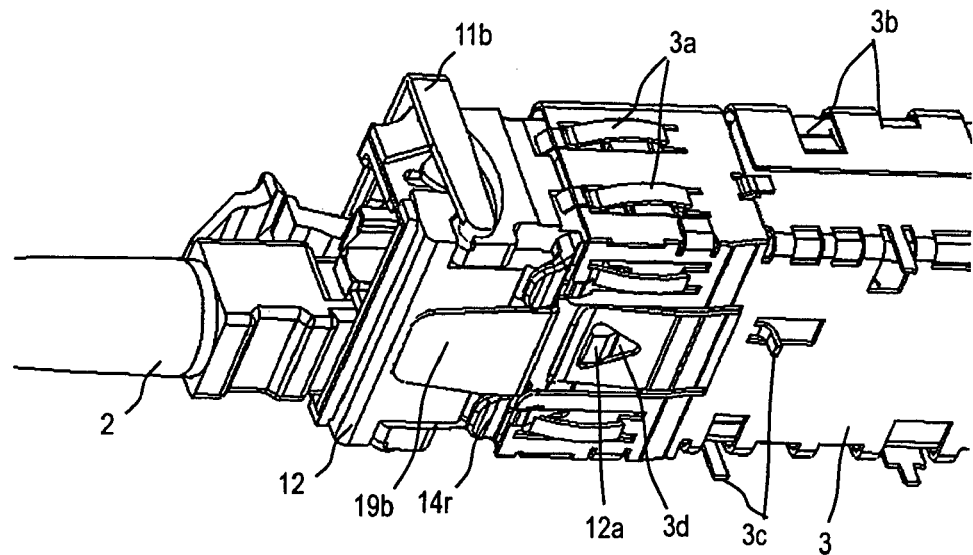
FIG. 14 is a bottom view of the transceiver inserted into the cage.

FIG. 14 views the transceiver 1 inserted within the cage 3 from the bottom. The cage 3, configured to a metal box with one end thereof opened for the outside, receives the transceiver 1 in this open end, and only the bail 11 and the actuator 12 are exposed from the cage 3. The cage 3 provides a plurality of stud pins 3c to fix the cage 3 on the host system. Moreover, in the peripheral of the open end of the cage 3 is formed with a plurality of ground tabs 3a, which comes in contact to the edge of the opening of the face panel, into which the transceiver is inserted. When the transceiver is removed from the cage 3, this ground tabs suppress the EMI noise generated within the host system to leak from the opening or the propagating radiation in the outside to jump into the host system.

On the bottom of the cage 3 is provided with an opening 3d configured in a triangle, with which the latching projection 12a of the actuator engages to latch the transceiver 1 with the cage 3. To rotate the bail 11 to pull up the latching projection 12a may disengage the latching projection 12a with the opening 3d to release the transceiver 1 from the cage 3.

Assembly of the Cover

Figure 1B:
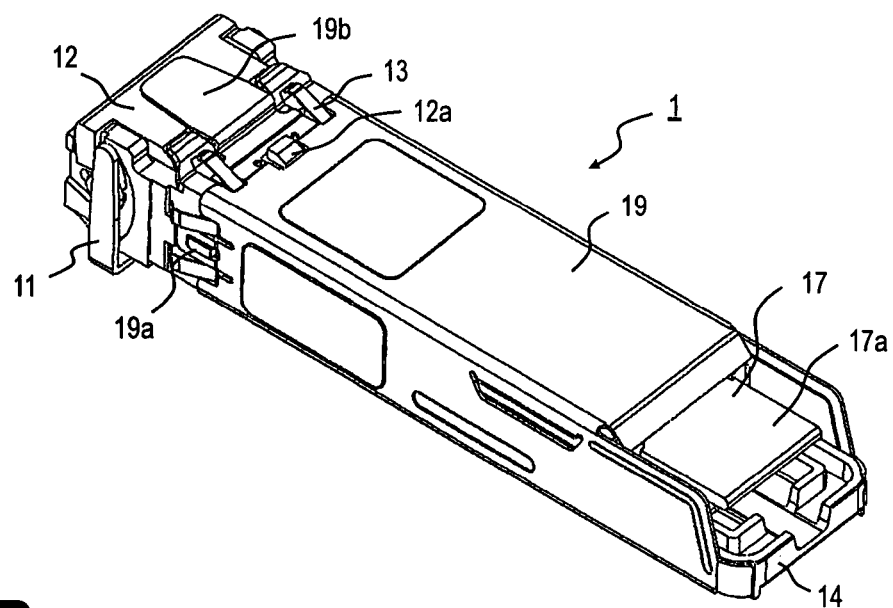
FIG. 1B is a perspective diagram viewed from the bottom of the transceiver.
Figure 15:
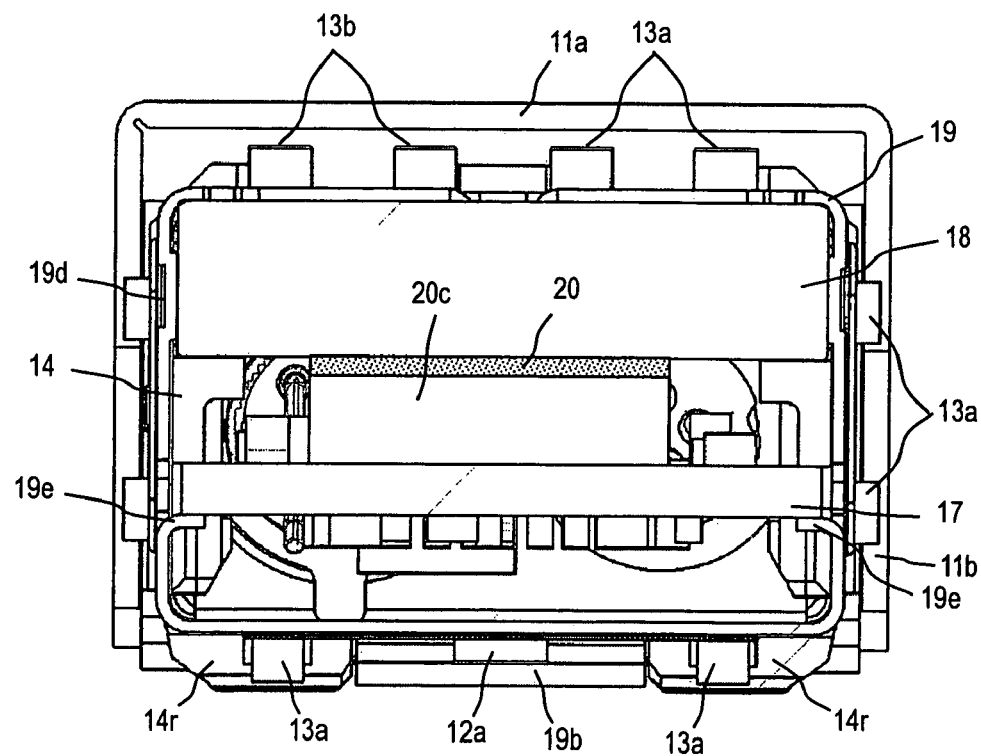
FIG. 15 is a cross section of the completed transceiver taken along the line A-A in FIG. 1A.

The cover 19, as shown in FIGS. 1A and 1B, covers the heat dissipating member 18 only in the both sides thereof to expose the most of the top surface. The cover 19 is set to the transceiver 1 from the rear thereof so as to put the frame 14, the substrate 17 and the heat dissipating member 18 within the cover. By fitting the opening formed in the latch tab 19a with the projection 14g in both sides of the first portion 14a of the frame 14, the cover 19 may be assembled with the frame 14, the substrate 17, and the heat dissipating member 18. In this process, the latching projection 12a of the actuator 12 protrudes through the opening 19c in the root of the support fin 19b provided in the front tip of the cover 19, which does not disturb the latching mechanism between the latching projection 12a and the opening 3d in the cage 3. In the both sides of the cover 19 are formed with a dent 19d to enhance the thermal coupling between the heat dissipating member 18 and the cover 19. That is, as shown in a cross section of FIG. 15, the distance between the dents 19d is set slightly smaller than the width of the heat dissipating member 18 to make the member 18 in firmly and stably contact to the cover 19 in the transverse direction. FIG. 15 is a cross section taken along the line A-A in FIG. 1A.

Moreover, the cover 19 provides a piece 19e bent inward in both sides thereof, by which the heat dissipating member 18, the frame 14 and the substrate 17 are put between the top surface of the cover 19. By setting the gap from this bent portion to the top of the cover 19 slightly smaller than the total thickness of these three members, 14, 17 and 18, the cover 19 firmly sets these members between the bent portion 19e and the top without any rattling. The thickness of the thermal sheet 20 is so selected that the summed thickness of the thermal sheet 20 and the IC 20c is greater by 30% than the height of the frame 14. That is, the thermal sheet 20 is always compressed by 30% to couple the sheet 20 with the IC 20c in thermally stable. The cover 19, as already explained, may play a role to fix the finger member 13 by putting the member 13 with the frame 14.

Thus described transceiver 1 of the present invention may be assembled only by fitting the primary members of the frame 14, the substrate 17, the heat dissipating member 18, the OSAs, 15 and 16, and the cover 19, without any screwing nor gluing. Accordingly, not only the cost for the components may be reduced, but also the process may be simplified to reduce the process cost. Moreover, the heat dissipating member 18 comes in contact to the IC 20c installed on the substrate 17 only via the thermal sheet 20, and the surface of the heat dissipating member 18 opposite to the side coming in contact to the IC 20c exposes in the greater part thereof. Accordingly, a superior heat dissipating performance may be achieved.

What is claimed is:

1. An optical transceiver inserted into a cage installed on a host system and optically coupling with an optical fiber by receiving an optical connector attached to the optical fiber, the optical transceiver comprising:

an optical subassembly for converting between an optical signal and an electrical signal;

a substrate for installing an electronic circuit electrically coupled with the optical subassembly;

a heat dissipating member thermally coupled with the electronic circuit for conducting and radiating heat generated by the electronic circuit, the heat dissipating member including first and second surfaces opposite to each other;

a frame made of resin for assembling the optical subassembly, the substrate and the heat dissipating member only by fitting, the frame including a pair of first type posts, a pair of second type posts and a groove, the first type posts transversely sandwiching the substrate and the second type posts longitudinally sandwiching the substrate, the first type posts each being accompanied by a beam extending longitudinally beneath the first type posts, the groove extending longitudinally in a center portion of the frame between the first type posts; and a metal cover for putting the optical subassembly, the substrate, the frame, and the heat dissipating member therein, wherein the first surface of the heat dissipating member comes in thermally contact to the electronic circuit and a greater part of the second surface exposes outside of the optical transceiver, and wherein the groove in the center portion of the frame facilitates to expand a space between tops of the first type posts for ensuring engaging force with the substrate by the beam.

2. The optical transceiver according to claim 1, wherein a cross section of the heat dissipating member along a longitudinal direction of the optical transceiver traces a cross section of the frame along the longitudinal direction, the heat dissipating member being assembled by sliding on the frame in transverse to the optical transceiver.

3. The optical transceiver according to claim 1,
wherein the second type post is accompanied by a groove just in a front side thereof to adjust a height of the second type post.

4. The optical transceiver according to claim 1,
wherein the frame provides a finger to set the optical subassembly, a gap between the finger and a wall of the frame facing the finger being smaller than a diameter of the optical subassembly,
wherein the optical subassembly is fitted between the finger and the wall.

5. The optical transceiver according to claim 4,
wherein the optical subassembly provides a pair of flanges, and the frame provides a partition wall sandwiched by the paired flanges to position the optical subassembly in longitudinal of the optical transceiver when the optical subassembly is set between the finger and the wall.

6. The optical transceiver according to claim 1,
further comprising a finger member made of metal sheet and set so as to surround the frame, the finger member including a plurality of fingers, a plurality of projection tabs, and a plurality of supplemental fingers, the fingers each coming in contact with the cage to ground the frame, the projection tabs and the supplemental fingers coming in contact with the cover to form a heat dissipating path from the optical subassembly to the cover.

7. The optical transceiver according to claim 1,
wherein the cover provides a pair of dents in each side thereof to transversely fix the heat dissipating member by putting the heat dissipating member therebetween.

8. The optical transceiver according to claim 1,
wherein the cover provides a bent piece in a side thereof, the bent piece abutting the frame, the substrate and the heat dissipating member against a top surface of the cover, the heat dissipating member being fixed in vertical by the bent piece and the top surface of the cover.

9. The optical transceiver according to claim 1,
wherein the frame forms a pair of arched portions in both sides of the groove to provide room to bend the frame so as to expand a space between tops of the first type post.

10. The optical transceiver according to claim 2,
wherein the heat dissipating member provides a hooked projection and a plurality ribs, and the frame provides an overhang and a plurality of grooves to receive corresponding ribs of the heat dissipating member, and
wherein the heat dissipating member is assembled with the frame by transversely sliding the heat dissipating member on the frame so as to mate the hooked projection with the overhand and the ribs with the corresponding grooves.

* * * * *